United States Patent [19]
Van Order et al.

[11] Patent Number: 5,091,831
[45] Date of Patent: Feb. 25, 1992

[54] VEHICLE FOIL LAMINATED LAMP MOUNT

[75] Inventors: Kim L. Van Order, Hamilton; Jerry M. DeJong, West Olive; Kenneth M. Lindberg, Holland, all of Mich.

[73] Assignee: Prince Corporation, Holland, Mich.

[21] Appl. No.: 548,024

[22] Filed: Jul. 5, 1990

[51] Int. Cl.⁵ .............................................. B60Q 3/02
[52] U.S. Cl. ....................................... 362/74; 362/135; 296/214
[58] Field of Search ............... 350/276 R, 277, 606; 296/97.5, 214, 37.7; 362/61, 74, 135, 240

[56] References Cited

U.S. PATENT DOCUMENTS

| | | | |
|---|---|---|---|
| 4,174,864 | 11/1979 | Viertal et al. | 296/97.5 |
| 4,271,408 | 6/1981 | Teshima et al. | 362/240 |
| 4,783,110 | 11/1988 | Beukema et al. | 296/37.7 |
| 4,869,670 | 8/1989 | Ueda et al. | 439/34 |
| 4,893,867 | 1/1990 | Hilborn et al. | 296/214 |

FOREIGN PATENT DOCUMENTS

| | | | |
|---|---|---|---|
| 3523911 | 1/1987 | Fed. Rep. of Germany | 296/97.5 |
| 3804362 | 8/1989 | Fed. Rep. of Germany | 296/97.5 |

Primary Examiner—Ira S. Lazarus
Assistant Examiner—Sue Hagarman
Attorney, Agent, or Firm—Price, Heneveld, Cooper, DeWitt & Litton

[57] ABSTRACT

An electrical component mounting system includes a substrate having a foil laminate on one side configured to provide a pair of spaced conductors extending adjacent a socket aperture formed through the substrate. An electrical component includes a socket that fits into the socket aperture to engage the foil for providing activating power to the component directly through the foil covered substrate.

30 Claims, 3 Drawing Sheets

VEHICLE FOIL LAMINATED LAMP MOUNT

BACKGROUND OF THE INVENTION

The present invention pertains to structure for mounting a lamp or other electrical device in a vehicle headliner or a vehicle accessory.

Presently, overhead lamps installed in vehicle headliners and the like, typically employ a housing mounted to the vehicle itself into which the lamp (i.e. bulb) and its socket and switching components are mounted. The assembly also typically includes a trim bezel which may include lenses, diffusers or the like. In recent years such structure has been mounted directly to a vehicle headliner for modular assembly of the headliner to the vehicle. With such modular mounting, the lamp housing and socket are first installed in the vehicle headliner together with their associated wire harness. Subsequently, the entire headliner assembly is mounted to the vehicle roof and an interconnecting wire harness in the vehicle is connected to one or more of the harnesses associated with the headliner. Such construction, although simplifying the installation process, still requires the utilization of a lamp housing and associated hardware including, electrical harnesses, typically in a bundle of wires which include connectors at opposite ends for coupling the modular housing to the vehicle's electrical system as the headliner is installed.

SUMMARY OF THE PRESENT INVENTION

The system of the present invention overcomes the complexity of the installation of electrical components such as lamps by providing a conductive foil laminated generally planar substrate, such as a headliner, or a visor body, which includes a mounting aperture therein for receiving a mounting bezel including an electrical component such as a lamp mounted directly thereto. The aperture defines a socket configured to allow the lockable insertion of a bezel including a lamp, for example, directly within the aperture and to the headliner and subsequently translated either linearly or rotationally for providing electrical contact with a surface of the substrate which is foil covered. The foil covering is divided into conductive segments for providing an activating voltage and a common return line for applying power to the component so installed.

Systems embodying the present invention therefore include a substrate having a foil laminate on one side configured to provide at least a pair of spaced conductors extending adjacent a socket defining aperture formed through said substrate. Means for mounting an electrical component to said substrate socket is provided such that contacts associated with said component engage said foil for providing activating power to the component directly through the foil lined substrate. In one embodiment of the invention, the substrate is formed in the shape of a vehicle headliner and the component is an electrical overhead lamp. In another embodiment of the invention, the substrate is a portion of a vehicle visor core.

With such a system, the component housing and wiring associated with both the component and the substrate is eliminated in its entirety and the cost of manufacturing is reduced and the ease of assembly of the system is greatly enhanced. These and other features, objects and advantages of the present invention, will become apparent to those skilled in the art upon reading the following description thereof together with reference to the accompanying drawings in which:

DETAILED DESCRIPTION OF THE PREFERRED EMBODIMENT

Figure 1:
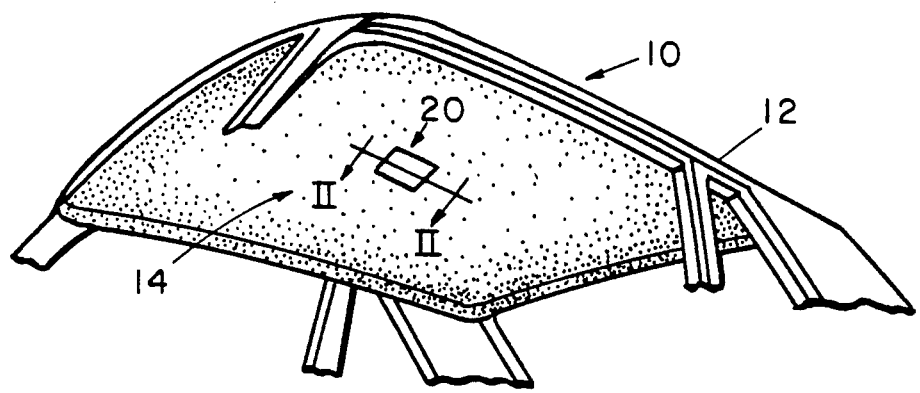
FIG. 1 is a fragmentary perspective view of a vehicle headliner embodying the present invention.

Referring initially to FIG. 1, there is shown a vehicle 10 including a roof 12 into which a modular headliner assembly 14 has been mounted by any conventional means such as by fasteners, adhesives or in part by the utilization of snap-in visors as taught by U.S. Pat. No. 4,569,552 issued to Larry Marks on Feb. 11, 1986, and assigned to the present Assignee. Mounted to the headliner 14 is an overhead dome lamp assembly 20 which together with the headliner incorporates the component mounting system of the present invention.

Figure 2:
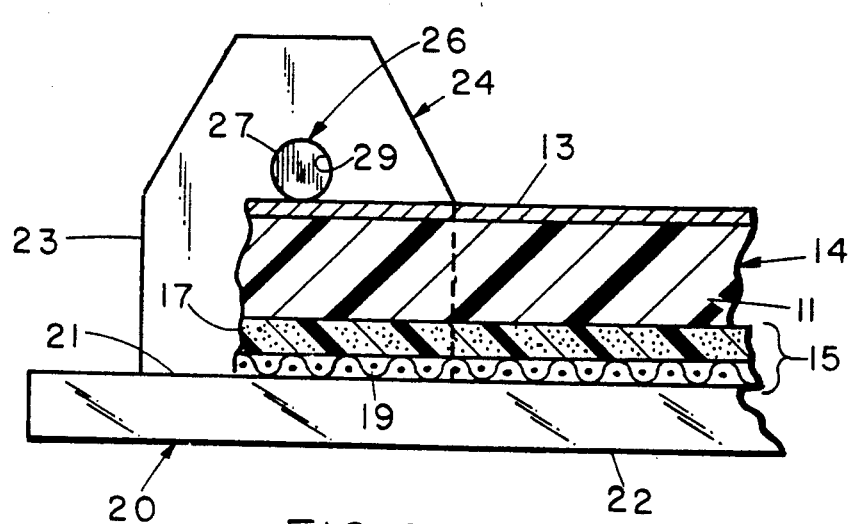
FIG. 2 is an enlarged fragmentary cross-sectional view of a portion of the headliner assembly shown in FIG. 1 and taken along section line II—II in FIG. 1.

Referring now to FIG. 2 there is shown a greatly enlarged vertical cross-sectional view of a portion of headliner 14 which in the preferred embodiment includes a substrate 11 which may be of any suitable material such as fiberboard or any number of molded polymeric materials, fiberglass or the like. One such material is also disclosed in U.S. Pat. No. 4,828,910, issued May 9, 1989 and entitled SOUND ABSORBING LAMINATE, the disclosure of which is incorporated herein by reference. Integrally attached to the lower surface of substrate 11 by suitable bonding, is a foam backed fabric 15 comprising a layer of foam material 17 covered by a suitable upholstery fabric 19. Fabric 15 typically is integrally made and bonded to the substrate 11 as a single piece during the molding of the headliner 14.

On the surface of substrate 11, which is the upper surface of substrate 11 in FIG. 1, there is applied by a suitable adhesive, such as poly vinyl acetate (PVA), a layer of electrically conductive material 13 such as aluminum foil or other suitable electrically conductive material. In one embodiment of the invention, the headliner substrate 11 and foil 13 was made of a fiberboard substrate having a thickness of approximately 0.080 of an inch with the foil layer 13 having a thickness of approximately from 0.00025 to 0.005 inches. Such material is commercially available from Fiber Converters Inc. and is employed for its thermal insulation properties in vehicle panels. This board can be press-formed into the desired three dimensional headliner or other configuration by conventional presses.

Figure 5:
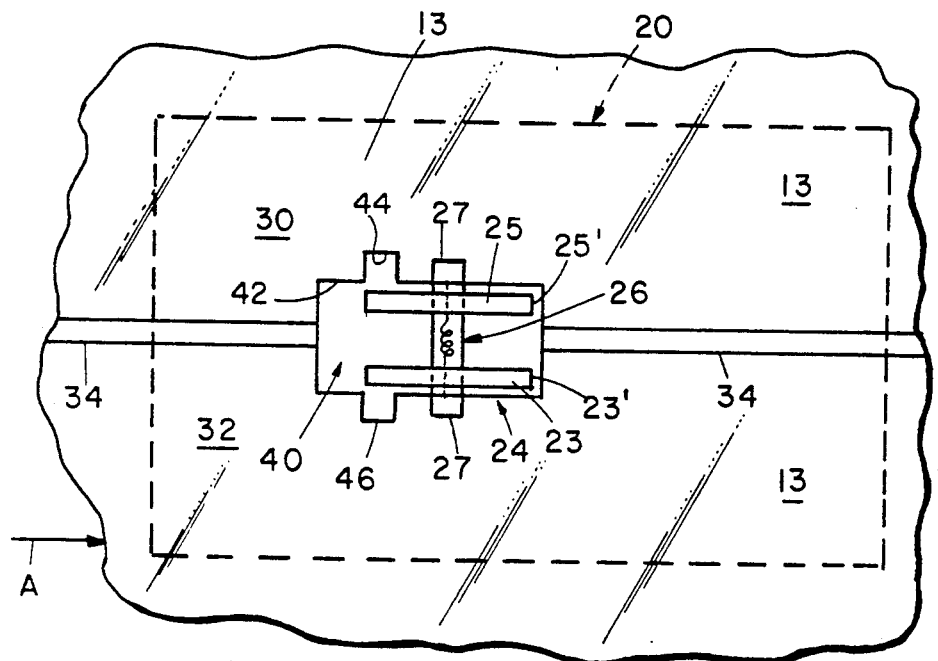
FIG. 5 is a enlarged top or rear plan view, respectively, of the structure shown in FIGS. 1 and 3.

In FIG. 2 there is shown mounted to headliner 14, a lamp assembly 20 which includes an integral bezel and lens 22 with a bulb receiving mechanical socket 24 for receiving and holding a cartridge-type bulb 26. The bulb socket 24 is best seen with reference to FIGS. 2 and 5 which show a pair of plastic arms 23 and 25 which extend upwardly from the upper surface 21 of integral lens 22. The arms are made of a suitable non-conductive material such as polycarbonate as is the integral lens. Each arm includes an aperture 29 for snugly holding the tips of the bulb between arms 23 and 25 in spaced relationship to upper surface 21 of lens 22. The spacing between arms 23 and 25 is selected such that the conductive tips 27 of the bulb 26 extend outwardly of the arms as best seen in FIG. 5. The vertical spacing of apertures 29 in arms 23 and 25 is selected for the thickness of the headliner material such that tips 27 of the bulb are held in compressive electrical contact with foil conductors 30 and 32 (FIG. 5) of the component receiving socket 40 formed through the headliner 14.

As can be seen in FIG. 5, each contact end 27 of cartridge bulb 26 comes into direct contact with conductors 30 and 32 defined in foil 13 by tracks 34 separating the foil into the two conductors. The tracks are areas in which the foil is either not applied or is removed to insulate the conductors 30 and 32 from one another.

Figure 6:
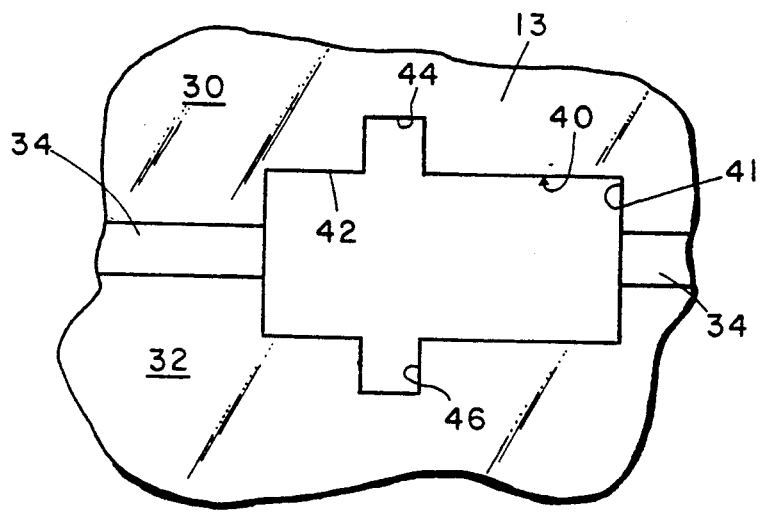
FIG. 6 is a top plan view of the socket formed in the headliner shown in FIGS. 1,4, and 5.

The bulb socket 24 interfits with the headliner 14 as best seen in FIGS. 2, 5 and 6 by the provision of a headliner socket 40 which comprises a rectangular aperture 42 cut through the entire headliner and aligned with the insulating tracks 34 as best seen in FIG. 6. Aperture 42 includes a pair of outwardly extending opposed slots 44 and 46 through which the tip ends 27 of the bulb 26 can be extended once the bulb is installed in the bulb receiving socket 24 of the lamp housing 20. Thus, for installation, the lamp housing 20 is inserted upwardly with the tip ends 27 of bulb 26 extending through slots 44 and 46 of aperture 42 and the entire assembly translated in the direction indicated by arrow A in FIG. 5 until arms 23 and 25 engage edge 41 of the socket 40. In this position, tips 27 of the bulb compressibly and forcibly engage the foil layer 13 of the upper surface of the headliner and particularly the two electrical conductors 30 and 32 defined thereby.

Figure 7:
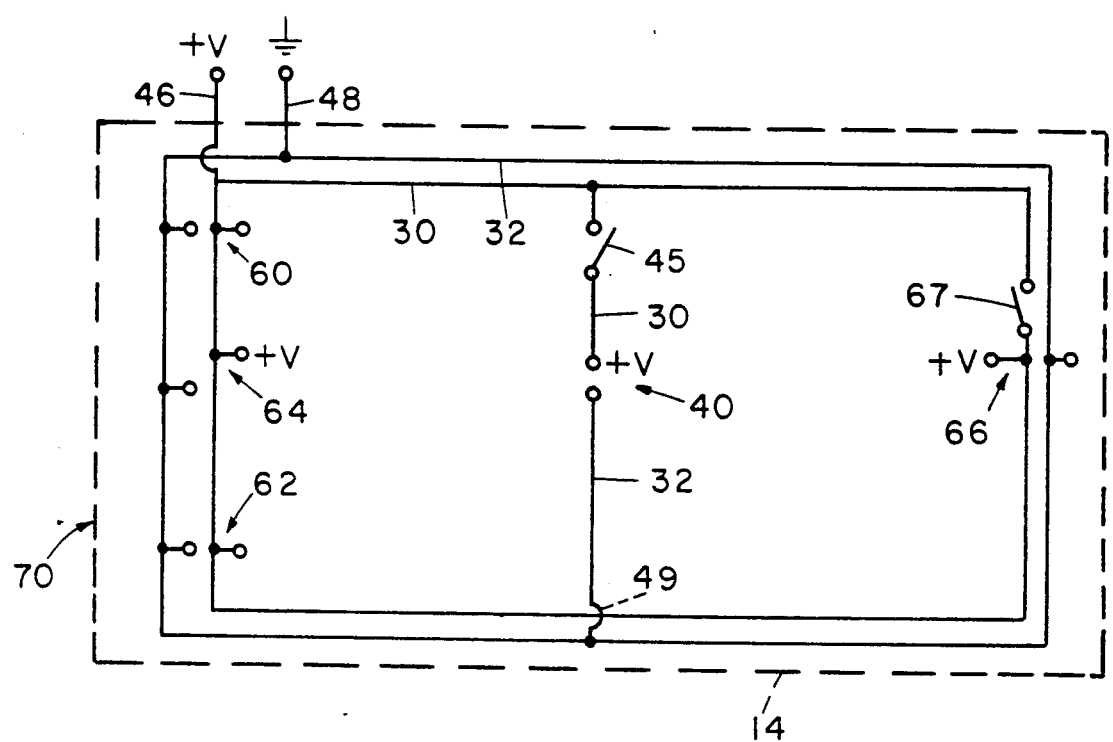
FIG. 7 is an electrical circuit diagram in schematic form of a headliner embodying the system of the present invention.

Electrical operating power is supplied to the conductors 30 and 32 by suitable supply conductors 46 and 48 positioned along a corner of the headliner as seen in FIG. 7. Thus, electrical conductor 46 couples tracks of foil defining conductors 30 to the +V or battery side of the vehicle while a second conductor 48 couples the conductor 32 defined by suitable foil layers patterned on the upper surface of headliner 14 to the vehicle ground system. Conductors 46 and 48 can be attached to the foil by any suitable means such as by soldering to the foil utilizing a suitable conventional solder joint or by a mechanical and electrical terminal such that the conductors make a suitable electrical contact with the foil conductors patterned on the headliner roof.

In some instances, it may be necessary to provide electrical jumpers between tracks formed in the headliner as illustrated, for example, at 49 in FIG. 7. Such electrical jumpers can be formed by suitable conductive segment which overlies the foil 13 but itself has an insulated body with only the ends electrically contacting sections of foil desired to be electrically coupled. By laying out the topology of the foil pattern in the headliner, either by the application of foil during the manufacturing process or by its removal to form insulating tracks between sections, the utilization of jumpers, such as 49 shown in FIG. 7, can be minimized. A more detailed discussion of the conductors required for particular applications is presented below following the discussion of the FIG. 3 embodiment.

Figure 3:
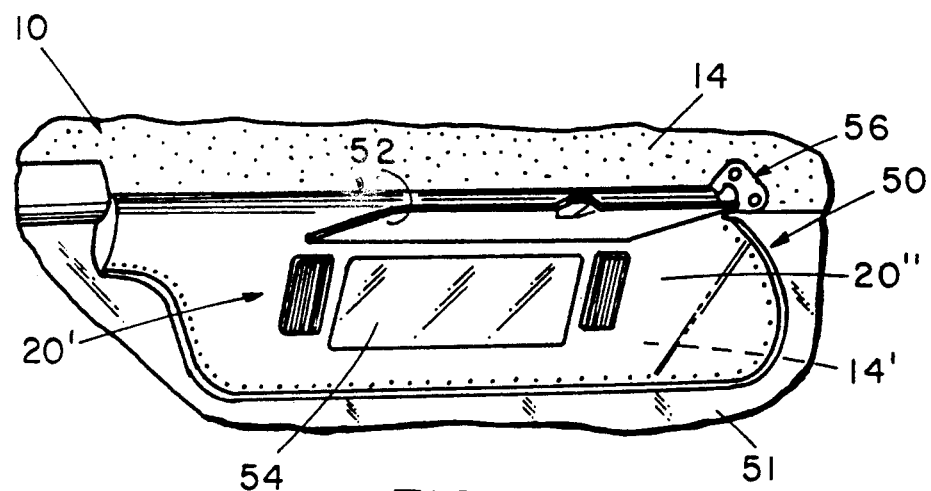
FIG. 3 is a fragmentary perspective view of a vehicle visor embodying the present invention.
Figure 4:
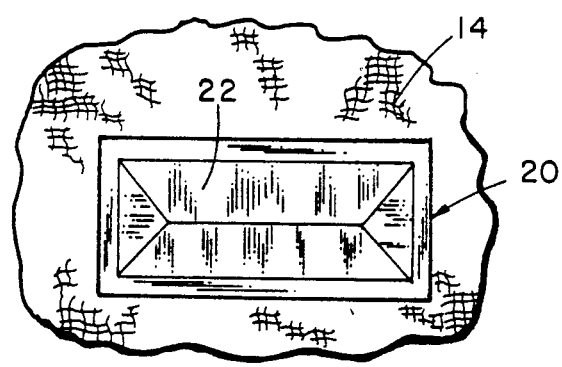
FIG. 4 is an enlarged fragmentary bottom or front plan view of the lamp assembly of FIGS. 1 and 3, respectively, mounted according to the present invention.

FIG. 3 discloses the utilization of the lamp mounting system shown in FIGS. 2, and 4–6 in a visor 50 which is mounted to the headliner 14 and includes a pair of lamps 20′ and 20″ which can be mounted to the visor body. The visor body is formed of the same material as the headliner and includes a hollow core having a substrate 14′ defining at least one side of the visor body into which the lamp assemblies 20′ and 20″ are mounted. The hollow visor core can be constructed generally according to the teachings of U.S. patent application Ser. No. 439,451, filed Nov. 20, 1989, entitled VISOR AND METHOD OF MAKING THE SAME the disclosure of which is incorporated herein by reference. Instead of using the material 14 shown in FIG. 2, the non-conductive fiber material of the above identified patent application is employed and one side, the interior, of the visor core, is covered by a foil layer patterned to to define two lamp receiving sockets for assemblies 20′ and 20″ which can be identical to that shown in FIGS. 2 and 4–6. This inexpensively mounts lamp assemblies 20′ and 20″ to visor 50.

Visor 50 includes a cover 52 which selectively encloses the lamp assemblies 20′ and 20″ and a mirror 54 positioned therebetween for providing an illuminated covered vanity mirror visor which is pivotally mounted to the vehicle headliner by means of a pivot mounting bracket 56 in a conventional manner. The visor is shown in the lowered use position extending over the upper edge of the windshield 51 of the vehicle 10. The vehicle cover and frameless mirror can be attached to the visor core as disclosed in U.S. patent application Ser. No. 383,542; filed on July 24, 1989, and entitled MULTIPLE FUNCTION VISOR, the disclosure of which is incorporated herein by reference.

As noted above, the foil layer 13 is preferably laid out in conductive strips 30 and 32 adjacent the socket 40 formed by an aperture 42 for receiving a lamp assembly or other electrical components such as a switch or the like which likewise contains contacts which engage the foil conductors in a manner that electrical terminals 27 of bulb 26 engages the conductors as shown in FIGS. 2 and 5. In providing the foil conductors, the conductors should be laid out to conduct a suitable amount of current for a given application. With, for example, the aluminum foil of the preferred embodiment of the present invention, which has a thickness of approximately 0.25 mils, the cross-sectional area desired for a current carrying capability of 5.7 amperes is 338 sq. mils. Thus, the width of each conductor made of the foil should have a minimum width of approximately 1.352 inches which provides a resistivity of 0.039 ohms per foot at 20° C. This provides, for the thickness of aluminum foil employed, adequate conductive capabilities for lamps employed for overhead lighting of a vehicle, for the visor lighting; and other typical lighting needs for the interior of a vehicle. Naturally, if copper is employed, the width of the conductors can be reduced accordingly since its conductivity is significantly greater.

The space between conductors is selected to provide a break-over voltage of 15 kilovolts as required by the automotive industry. For the commercially available material used in the preferred embodiment, the tracks 34 have a width of approximately 0.75 inches to achieve this break-over voltage capability. The foil layer 13 can, with the exception of the immediate area adjacent sockets 40, be covered by a suitable insulating material such as a Mylar film to prevent electrical shorting of the foil material to the sheet metal roof 12 of the vehicle. Naturally, other means of insulating the conductors, such as by an electrically insulative coating in a conventional manner, or spacers also could be employed. It is necessary only to assure that the foil layer immediately adjacent the sockets in the contact area of the electrical devices to be installed remain uncoated such that a good electrical contact between the electrical component and the foil substrate is provided.

In FIG. 7, the conductors 30 and 32 are arranged in a generally rectangular pattern around the periphery of the headliner 14 to define a center socket 40 for an overhead dome light such as shown in FIGS. 1, 2 and 3–6. Door actuated switches, illustrated schematically as a single switch 45 in the Fig., can be suitable coupled in one leg of the conductor 30 to provide power to socket 40 for the courtesy light 20 only when one of the doors are open, or when a dash mounted switch 45 is actuated. This provides operating power to the electrical socket 40 defined in part by the conductors 30 and 32 immediately surrounding the aperture 42 formed in the headliner substrate. The headliner also includes sockets 60 and 62 which can be employed for supplying power to an illuminated vanity mirror visors such as visor 50 illustrated in FIG. 3. Similarly, a socket 64 can be provided near the center of the front windshield area 70 of the headliner to provide operating power to an overhead console which may include, for example, an electrical compass, map reading lights or the like. A rear socket 66 also can be provided for providing power to a rear stop light through a brake light switch 67 coupled in circuit with conductors 30 and 32 by means of an interconnection to the conductors immediately adjacent the socket employed for the brake light which can be of the same type construction that is shown in the FIGS. 2 and 4–6 embodiment.

In connection with the formation of the various sockets through the headliner by providing apertures to permit the lamp socket 24 to be mounted therein, the sockets instead of being rectangular providing a push-in and linear translation to install the lamps, can be circular with a bayonnet-shaped mounting aperture such that the lamps are initially pushed in through slots formed in the circular patterned aperture and subsequently rotated to provide the electrical and mechanical connection to two adjacent electrically spaced conductive portions of the conductive foil 13. In the embodiment shown, for example, in FIG. 5, the lamp is translated in a linear fashion in the direction indicated by arrow A until the edges 23' and 25' of legs 23 and 25, respectively, engage the trailing edge 41 of the aperture 42 thereby providing a stop for the final installed position of the lamp 20. The stop position is selected such that the contact tips 27 of the lamp 26 are suitably positioned in spaced relationship to apertures 44 and 46 to remain in solid electrical contact with the foil 13 forming conductors 30 and 32. As seen in FIG. 5, the center of bulb 26 is centered at the center of aperture 42 forming the socket 40 to allow light from the bulb to be directed downwardly through the lens 22. The lens may be generally hollow with a surface configured as desired to direct or diffuse light. It may be integrally formed, as by molding, with floor 21 and legs 23 and 25 to define an integrated bulb holding socket, bezel, and lens.

It will become apparent to those skilled in the art that various modifications to the preferred embodiments of the invention described wherein can be made without departing from the spirit or scope thereof as defined by the appended claims.

The embodiments of the invention in which an exclusive property or privilege is claimed as defined as follows:

1. A vehicle headliner comprising:
    a substrate having an insulative layer and a conductive layer on at least one side of said insulative layer, said substrate having an aperture formed therein to define an electrical component receiving socket with said conductive layer extending adjacent said aperture to define a pair of spaced electrical contacts extending adjacent at least one edge of said aperture for supplying electrical energy to said socket; and
    an electrical component including electrical contact means extending through said aperture and engaging said contacts for providing electrical contact between an electrical device of said component and said substrate, said component compressively engaging said substrate to hold said component in position within said aperture formed in said substrate to provide mechanical and electrical connection of said electrical component to said substrate.

2. The apparatus as defined in claim 1 wherein said component engages opposite sides of said substrate to compressively hold said component in engagement with said substrate and to assure an electrical connection between said contact means and said contacts.

3. The apparatus as defined in claim 2 wherein said conductive layer is divided into at least two conductive segments defining conductors terminating in said contacts, and wherein said component includes at least a pair of component contacts separately engaging said contacts.

4. The apparatus as defined in claim 3 wherein said contacts extend adjacent opposite sides of said aperture defining said socket.

5. The apparatus as defined in claim 4 wherein said electrical component comprises a lamp assembly.

6. The apparatus as defined in claim 5 wherein said lamp assembly comprises a lamp socket including means for supporting an elongated cartridge-type bulb in spaced relationship to a lens wherein said bulb extends on one side of said substrate with the ends of said bulb defines said pair of component contacts and are electrically coupled to said substrate and said lens engages the opposite side of said substrate and is spaced from said bulb a distance to position said component contacts of said bulb is compressive engagement with said contacts of said substrate.

7. The apparatus as defined in claim 1 wherein said substrate is a compressed fibrous material.

8. A vehicle headliner comprising:
    a substrate having an insulative layer and a conductive layer on at least one side of said insulative layer, said substrate having an aperture formed therein to define an electrical component receiving socket with said conductive layer extending adjacent said aperture for applying electrical energy to said socket wherein said conductive layer is divided into at least two conductive segments defining conductors which extend adjacent opposite sides of said aperture defining said socket; and
    a lamp assembly which comprises a lamp socket including means for supporting an elongated cartridge-type bulb in spaced relationship to a lens wherein said bulb extends into said aperture on one side of said substrate with the ends of said bulb defining a pair of contacts which are in electrical contact with said conductive layer of said substrate and said lens is in contact with the opposite side of said substrate and spaced from said bulb a distance to position said contacts of said bulb in compressive engagement with said conductors of said substrate, wherein said lamp assembly engages opposite sides of said substrate to compressively hold said component in engagement with said substrate and to assure an electrical connection between said contacts and said conductors, and wherein said aperture of said substrate includes slot means permitting the entry of said bulb therein wherein said lamp assembly is subsequently translated for positioning said bulb in compressive engagement with said conductive layer of said substrate.

9. The apparatus as defined in claim 8 wherein said conductive layer comprises an aluminum foil and said substrate comprises a fiberboard material.

10. The apparatus as defined in claim 9 wherein said substrate is formed in the shape of a vehicle headliner and which includes a plurality of said apertures for defining a plurality of electrical component receiving sockets.

11. A vehicle visor comprising:
a core made of an electrically insulative member, said member having at least one side covered with a layer of conductive material, said core further including an aperture formed therethrough to define a socket for receiving an electrical component wherein said conductive material defines at least one conductor which terminates adjacent said aperture to provide an electrical contact; and
an electrical component including contact means said component extending through said aperture to compressively engage said contact of conductive material to receive operating power therefrom.

12. The apparatus as defined in claim 11 wherein said electrical component comprises a lamp assembly.

13. A vehicle visor comprising:
a core made of an electrically insulative member, said member having at least one side covered with a layer of conductive material, said core further including an aperture formed therethrough to define a socket for receiving an electrical component; and
a lamp assembly including contact means which extend through said aperture to engage said conductive material to receive operating power therefrom, wherein said lamp assembly comprises a lens and a pair of spaced arms extending from said lens, said arms including a pair of apertures for receiving a cartridge-type bulb, said arms spaced from one another a distance to permit ends of said bulb to be exposed.

14. The apparatus as defined in claim 13 wherein said arms of said lamp assembly space said ends of said bulb through said aperture to engage said conductive material in compression.

15. The apparatus as defined in claim 14 wherein said aperture includes a pair of slots along opposite edges thereof to allow said bulb to pass through said aperture and subsequently be translated into position to engage said conductive material.

16. The apparatus as defined in claim 15 wherein said conductive material is formed to define a pair of conductors which extend adjacent said aperture.

17. The apparatus as defined in claim 16 wherein said conductive material is a foil laminated onto said insulative member.

18. The apparatus as defined in claim 17 wherein said visor includes a pair of spaced socket defining apertures and a pair of lamp assemblies mounted in said apertures.

19. A vehicle substrate onto which an electrical component can be mounted for receiving electrical operating power therefrom comprising:
a sheet of insulating material formed in the shape of a vehicle interior member;
a layer of conductive material attached to one side of said sheet of insulating material; and
a socket defining aperture formed through said sheet and layer for receiving an electrical component such that contacts on the component engage said layer of conductive material for receiving electrical power from said material.

20. The apparatus as defined in claim 19 wherein said layer of conductive material is a foil layer bonded to said insulating material.

21. The apparatus as defined in claim 20 wherein said insulating material is fiberboard.

22. The apparatus as defined in claim 19 wherein said interior member is a headliner.

23. The apparatus as defined in claim 19 wherein said interior member is a visor.

24. The apparatus as defined in claim 19 and further including an electrical component for mounting to said aperture defining socket.

25. The apparatus as defined in claim 24 wherein said electrical component comprises a lamp assembly.

26. A vehicle panel comprising:
a substrate having an insulative layer and a conductive layer on at least one side of said insulative layer, said substrate having an aperture formed therein to define an electrical component receiving socket with said conductive layer extending adjacent said aperture to define a pair of spaced electrical contacts extending adjacent at least one edge of said aperture for supplying electrical energy to said socket; and
an electrical component including electrical contact means extending through said aperture and engaging said contacts for providing electrical contact between an electrical device of said component and said substrate, said component compressively engaging said substrate to hold said component in position within said aperture formed in said substrate to provide mechanical and electrical connection of said electrical component to said substrate.

27. The apparatus as defined in claim 26 wherein said panel is a vehicle headliner.

28. The apparatus as defined in claim 27 wherein said electrical component is a lamp assembly.

29. The apparatus as defined in claim 26 wherein said panel is a visor core.

30. The apparatus as defined in claim 29 wherein said electrical component is a lamp assembly.

* * * * *

UNITED STATES PATENT AND TRADEMARK OFFICE
CERTIFICATE OF CORRECTION

PATENT NO. : 5,091,831

DATED : February 25, 1992

INVENTOR(S) : Kim L. Van Order et al.

It is certified that error appears in the above-identified patent and that said Letters Patent is hereby corrected as shown below:

Column 6, Claim 6, Line 50:
      "is" should be --in--.

Signed and Sealed this

Nineteenth Day of October, 1993

Attest:

BRUCE LEHMAN

Attesting Officer     Commissioner of Patents and Trademarks